(12) United States Patent
Engelbrecht et al.

(10) Patent No.: US 7,858,694 B2
(45) Date of Patent: Dec. 28, 2010

(54) POLYMERS OBTAINED VIA NITROXYL RADICAL POLYMERIZATION

(75) Inventors: Lothar Alexander Engelbrecht, Heerenveen (NL); Arend Noordam, Oranjewoud (NL)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 481 days.

(21) Appl. No.: 11/991,113

(22) PCT Filed: Aug. 21, 2006

(86) PCT No.: PCT/EP2006/065480

§ 371 (c)(1),
(2), (4) Date: Feb. 27, 2008

(87) PCT Pub. No.: WO2007/025885

PCT Pub. Date: Mar. 8, 2007

(65) Prior Publication Data

US 2009/0088518 A1 Apr. 2, 2009

(30) Foreign Application Priority Data

Aug. 30, 2005 (EP) .................... 05107914

(51) Int. Cl.
C08L 39/04 (2006.01)
C08L 31/00 (2006.01)
C08F 20/06 (2006.01)
C08F 26/06 (2006.01)

(52) U.S. Cl. .................... 524/548; 524/556; 526/317.1; 526/318; 526/319; 526/265

(58) Field of Classification Search ................ 524/548, 524/556; 526/317.1, 318, 319, 265
See application file for complete search history.

(56) References Cited

U.S. PATENT DOCUMENTS 6,353,107 B1 * 3/2002 Kramer et al. ............... 546/216

OTHER PUBLICATIONS

Ishizone et al. "Anionic polymerization of monomers containing functional groups. Part 11; Anionic polymerizations of alkynyl methacrylates" Macromolecular Chemistry and Physics, vol. 199, No. 9, 1998, pp. 1827-1834.*
T. Ishizone et al., Macromol. Chem. Phys. vol. 199, No. 9, pp. 1827-1834, (1998).

* cited by examiner

Primary Examiner—Michael M Bernshteyn
(74) Attorney, Agent, or Firm—Shiela A. Loggins

(57) ABSTRACT

Polymer of formula (I): $In-[(A)_x-(B)_y-(A')_{x'}-(E)_z]_n$ obtained by nitroxyl mediated controlled free radical polymerization whereby an access of acrylate is present, wherein In is the initiator fragment starting the polymerization reaction; A and A' are the same or different monomers selected from the group consisting of acrylic acid, methacrylic acid, acrylonitrile, methacrylonitrile, acrylic acid $(C_1-C_{22})$alkyl esters, acrylic acid $(C_1-C_{22})$hydroxyalkyl esters, methacrylic acid $(C_1-C_{22})$alkyl esters, methacrylic acid $(C_1-C_{22})$hydroxyalkyl esters, acrylic acid $(C_1-C_{22})$alkyl esters or methacrylic acid $(C_1-C_{22})$alkyl esters which are substituted by amino, $(C_1-C_{22})$alkylamino, $(C_1-C_{22})$dialkylamino, $—SO_3H$, epoxy, fluoro, perfluoro or siloxane groups, styrene, substituted styrene, acrylamide and methacrylamide, N-mono$(C_1-C_{22})$alkyl acrylamide, N,N-di$(C_1-C_{22})$alkyl acrylamide; provided that the amount of unsubstituted acrylic acid $(C_1-C_{22})$alkyl esters or/and methacrylic acid $(C_1-C_{22})$alkyl esters is more than 30% by weight based on the weight of the total monomer mixture; and B is at least one multifunctional monomer with two or more ethylenically unsaturated bonds with the proviso than at least one of these ethylenically unsaturated bonds is a high reactive double bond and the other or the others are less reactive double or triple bonds. E is a group bearing at least one stable free nitroxyl radical, which is bound via the oxygen atom to the polymer or copolymer; or a group which results from a substitution or elimination reaction of the attached stable free nitroxyl radical; x and x' independently is zero or a number between 5 to 5000; y is a number between 5 to 5000; z is a number 1 or greater than 1 indicating the average number of end groups E attached to the monomer sequence $(A)_x-(B)_y$; preferably z is 1; n is a number from 1 to 20, preferably 1.

13 Claims, No Drawings

POLYMERS OBTAINED VIA NITROXYL RADICAL POLYMERIZATION

The present invention relates to novel polymers.

U.S. Pat. No. 6,353,107 relates to a polymerizable composition comprising a) at least one ethylenically unsaturated monomer and b) a 1-alkoxy-polyalkyl-piperidine derivative. The ethylenically unsaturated monomer or oligomer is selected from the group consisting of ethylene, propylene, n-butylene, i-butylene, styrene, substituted styrene, conjugated dienes, acrolein, vinyl acetate, vinylpyrrolidone, vinylimidazole, maleic anhydride, (alkyl)acrylic acid anhydrides, (alkyl)acrylic acid salts, (alkyl)acrylic esters, (meth) acrylonitriles, (alkyl)acrylamides, vinyl halides or vinylidene halides. Polymers having a significant level of unsaturation are not specifically described.

It would be advantageous to have methods for forming polymers having a significant level of unsaturation but without significant crosslinking for use as reactive intermediate polymers or as pigment dispersing agents, wetting agents, leveling agents, etc.

Especially it would be advantageous to have an amine free dispersing agent and dispersing agents having improved pigment affinity.

It has been found that using nitroxyl mediated controlled free radical polymerization to polymerize multifunctional unsaturated monomers leads to selective polymerization of the high reactive double bond and non-polymerization of the less reactive double or triple bond.

Thus, the invention relates to a polymer of formula (I)

$$\text{In-}[(A)_x\text{-}(B)_y\text{-}(A')_{x'}\text{-}(E)_z]_n \qquad (I)$$

obtained by nitroxyl mediated controlled free radical polymerization whereby an access of acrylate is present, wherein In is the initiator fragment starting the polymerization reaction;

A and A' are the same or different monomers selected from the group consisting of acrylic acid, methacrylic acid, acrylonitrile, methacrylonitrile, acrylic acid ($C_1$-$C_{22}$)alkyl esters, acrylic acid ($C_1$-$C_{22}$)hydroxyalkyl esters, methacrylic acid ($C_1$-$C_{22}$)alkyl esters, methacrylic acid ($C_1$-$C_{22}$)hydroxyalkyl esters, acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, —$SO_3H$, epoxy, fluoro, perfluoro or siloxane groups, styrene, substituted styrene, acrylamide and methacrylamide, N-mono($C_1$-$C_{22}$)alkyl acrylamide, N,N-di ($C_1$-$C_{22}$)alkyl acrylamide; provided that the amount of unsubstituted acrylic acid ($C_1$-$C_{22}$)alkyl esters or/and methacrylic acid ($C_1$-$C_{22}$)alkyl esters is more than 30% by weight based on the weight of the total monomer mixture; and B is at least one multifunctional monomer with two or more ethylenically unsaturated bonds with the proviso than at least one of these ethylenically unsaturated bonds is a high reactive double bond and the other or the others are less reactive double or triple bonds.

E is a group bearing at least one stable free nitroxyl radical, which is bound via the oxygen atom to the polymer or copolymer; or a group which results from a substitution or elimination reaction of the attached stable free nitroxyl radical;

x and x' independently is zero or a number between 5 to 5000;

y is a number between 5 to 5000;

z is a number 1 or greater than 1 indicating the average number of end groups E attached to the monomer sequence $(A)_x$-$(B)_y$; preferably z is 1;

n is a number from 1 to 20, preferably 1.

In the context of this invention, the term "polymer" refers to a polymer of any type including homopolymers and copolymers. The term "copolymer" is meant to include polymers containing groups or units derived from two or more monomers with random, diblock, and multi-block microstructures. The copolymer can be block(co)polymers, comb (co)polymers, star(co)polymers, dendritic(co)polymers or hyperbranched(co)polymers. Block structures such as diblock, triblock are preferred.

When x and x' are zero, a homopolymer is obtained.

When x' is zero and x is a number between 5 to 5000 a diblock polymer AB is obtained.

When x and x' are a number between 5 to 5000 a triblock polymer ABA is obtained.

A random polymer can be obtained when the monomers are polymerized together.

In other words, after completing the polymerization of a first monomer to the extent desired to form a first polymer "block", a second monomer is introduced into the reaction mass to effect polymerization of the second monomer to form a second polymer "block" that is attached to the end of the first block. Using this sequential addition process, a broad range of diblock, triblock, etc. copolymers can be prepared.

The term "copolymer" also includes gradient copolymers or tapered copolymers which are copolymers composed for example of two monomers or monomer mixtures A and B in whose individual chains there is a gradient in the distribution of the monomer units along the chains. One end of the chain is rich in A units and the other in B units. Such copolymers show a continuous transition of one monomer or monomer mixture A into another monomer of monomer mixture B along the polymer chain.

The polymer is preferably a homopolymer (x and x' are zero) or a diblock, triblock, multiblock copolymer or a gradient copolymer.

The presence of "B" blocks (e.g. propargyl(meth)acrylates) is the basis for pigment affinity to certain organic or inorganic pigments.

The $C_1$-$C_{22}$alkyl groups may be linear or branched. Examples of such alkyl groups are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl, octadecyl and eicosyl. $C_1$-$C_{18}$alkyl is preferred.

Preferably the monomer A is styrene, methylacrylate, ethylacrylate, n-butylacrylate, isobutylacrylate, tert. butylacrylate, hydroxyethylacrylate, hydroxypropylacrylate, dimethylaminoethylacrylate, glycidyl acrylates, methyl(meth) acrylate, ethyl(meth)acrylate, butyl(meth)acrylate, hydroxyethyl(meth)acrylate, hydroxypropyl(meth)acrylate, dimethylaminoethyl (meth)acrylate, glycidyl(meth)acrylates, acrylonitrile, acrylamide, methacrylamide or dimethylaminopropylmethacrylamide or mixtures of them.

Especially preferred monomer A is methylacrylate, ethylacrylate, ethylhexylacrylate, propylacrylate, cyclohexylacrylate, hydroxyethylacrylate, n-butylacrylate, styrene, vinylpyridine.

Examples of multifunctional monomers B are multifunctional (meth)acrylates such as propargyl (meth)acrylate, allyl (meth)acrylate, butinyl (meth)acrylate, (meth)acrylate esters of polyunsaturated fatty alcohols such as oleyl (meth)acrylate or linolenyl (meth)acrylate, or diallyl maleate.

It is essential that an excess of acrylate is present for using controlled free radical polymerization.

As already mentioned the polymers are obtained by nitroxyl mediated controlled free radical polymerization (CFRP). Solomon et al. in U.S. Pat. No. 4,581,429 have firstly described such processes.

U.S. Pat. No. 4,581,429 discloses a free radical polymerization process by controlled or "living" growth of polymer chains, which produces defined oligomeric homopolymers and copolymers, including block and graft copolymers. Disclosed is the use of initiators of the partial formula R'R"N—O—X. In the polymerization process the free radical species R'R"N—O. and .X are generated. .X is a free radical group, e.g. a tert.-butyl or cyanoisopropyl radical, capable of polymerizing monomer units containing ethylene groups.

A variation of the above process is disclosed in U.S. Pat. No. 5,322,912 wherein the combined use of a free radical initiator and a stable free radical agent of the basic structure R'R"N—O. for the synthesis of homopolymers and block copolymers is described.

There are essentially two suitable routes to prepare the polymer of formula (I):

a) polymerization in the presence of alkoxyamine initiator/regulator compounds having the structural element

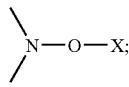

and b) polymerization in the presence of a stable nitroxyl free radical having the structural element

and a radical initiator (source of free radicals).

For example the structural element

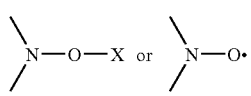

may be part of a cyclic ring system or substituted to form an acyclic structure.

Suitable nitroxylethers and nitroxyl radicals are principally known from U.S. Pat. No. 4,581,429 or EP-A-621 878. Particularly useful are the open chain compounds described in WO 98/13392(AKZO), WO 99/03894 and WO 00/07981 (both Ciba) the piperidine derivatives described in WO 99/67298 and GB 2335190 (both Ciba) or the heterocyclic compounds described in GB 2342649 (Ciba) and WO 96/24620.

Further suitable nitroxylethers and nitroxyl radicals are described in WO 02/4805 and in WO 02/100831. (both Ciba)

Nitroxylethers and nitroxyl radicals with more than one nitroxyl group in the molecule are for example described in U.S. Pat. No. 6,573,347, WO 01/02345 and WO 03/004471 (all Ciba). These compounds are ideally suitable when branched, star or comb (co)polymers are prepared. In this case y and/or n in formula (I) above are greater than 1.

In the context of the present invention the terms alkoxyamine and nitroxylether are used as equivalents.

Stable free radicals having a structural element

are for example disclosed in EP-A-621 878. (Xerox)

Examples, such as

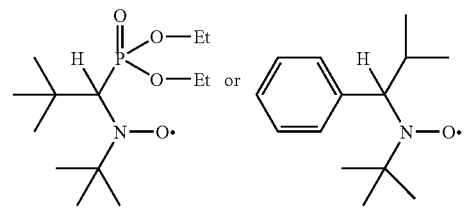

are given in WO 96/24620. (Elf Atochem)

Preferably the structural elements

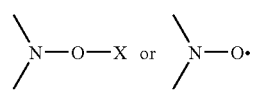

are part of a 5 to 7-membered heterocyclic ring, which optionally has an additional nitrogen or oxygen atom in the ring system. Substituted piperidine, morpholine and piperazine derivatives are particularly useful.

Preferably the structural element

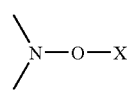

is a structural element of formula (II) and the structural element

is a structural element of formula (II')

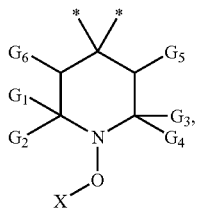
(II)

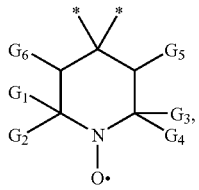
(II')

wherein
$G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5$, $G_6$ independently are H, $C_1$-$C_{18}$alkyl, phenyl, naphthyl or a group COO$C_1$-$C_{18}$alkyl;

X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

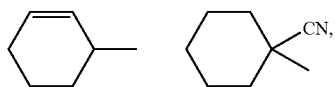

—CH$_2$CH=CH$_2$, CH$_3$CH—CH=CH$_2$, (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl and * denotes a valence.

In particular the structural element of formula (II) is of formula A, B or O,

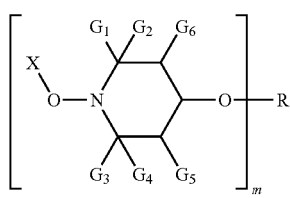
(A)

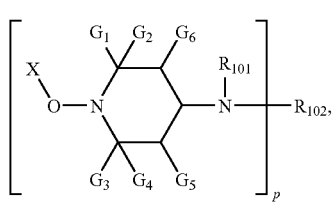
(B)

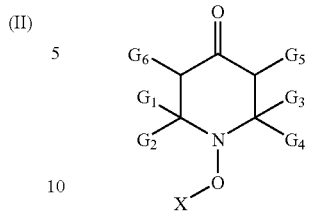
(O)

wherein
m is 1,
R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

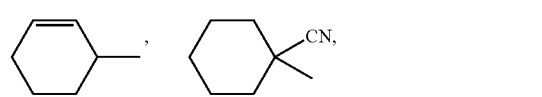

—CH$_2$CH=CH$_2$, CH$_3$CH—CH=CH$_2$, (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl.

The above compounds and their preparation are described in GB 2 335 190 and GB 2 361 235 and in U.S. Pat. No. 6,353,107.

Another preferred group of nitroxylethers are those of formula (IIc), (IId), (IIe), (IIf), (IIg) or (IIh)

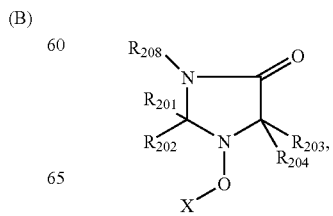
(IIc)

-continued (IId)
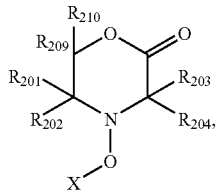

(IIe)
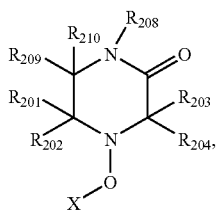

(IIf)
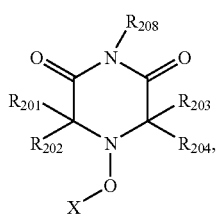

(IIg)
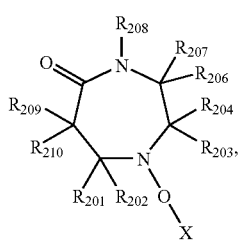

(IIh)
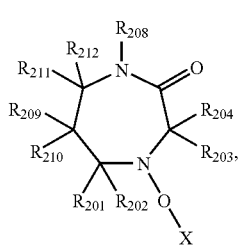

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl or $R_{201}$ and $R_{202}$ and/or $R_{203}$ and $R_{204}$ together with the linking carbon atom form a $C_3$-$C_{12}$cycloalkyl radical;

$R_{205}$, $R_{206}$ and $R_{207}$ independently are hydrogen, $C_1$-$C_{18}$alkyl or $C_6$-$C_{10}$aryl;

$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl;

$R_{209}$, $R_{210}$, $R_{211}$ and $R_{212}$ are independently hydrogen, phenyl or $C_1$-$C_{18}$alkyl; and X is selected from the group consisting of —$CH_2$-phenyl, $CH_3CH$-phenyl, $(CH_3)_2C$-phenyl, $(C_5$-$C_6$cycloalkyl$)_2$CCN, $(CH_3)_2$CCN,

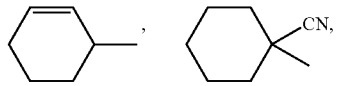

—$CH_2CH$=$CH_2$, $CH_3CH$—CH=$CH_2$, ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl.

More preferably in formula (Ic), (Id), (Ie), (f), (Ig) and (Ih) at least two of $R_{201}$, $R_{202}$, $R_{203}$ and $R_{204}$ are ethyl, propyl or butyl and the remaining are methyl; or $R_{201}$ and $R_{202}$ or $R_{203}$ and $R_{204}$ together with the linking carbon atom form a $C_5$-$C_6$cycloalkyl radical and one of the remaining substituents is ethyl, propyl or butyl.

Most preferably X is $CH_3CH$-phenyl.

The above compounds and their preparation are described in GB 2342649.

Further suitable compounds are the 4-imino compounds of formula (III)

(III)
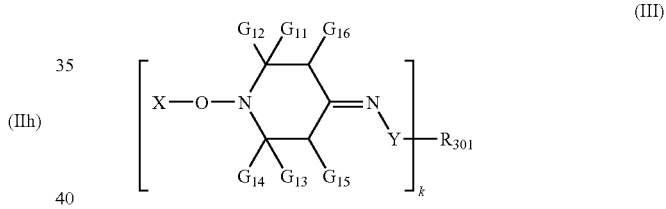

wherein $G_{11}$, $G_{12}$, $G_{13}$ and $G_{14}$ are independently $C_1$-$C_4$alkyl or $G_{11}$ and $G_{12}$ together and $G_{13}$ and $G_{14}$ together, or $G_{11}$ and $G_{12}$ together or $G_{13}$ and $G_{14}$ together are pentamethylene;

$G_{15}$ and $G_{16}$ are each independently of the other hydrogen or $C_1$-$C_4$alkyl;

X is as defined above;

k is 1, 2, 3, or 4

Y is O, $NR_{302}$ or when n is 1 and $R_{301}$ represents alkyl or aryl Y is additionally a direct bond;

$R_{302}$ is H, $C_1$-$C_{18}$alkyl or phenyl;

if k is 1

$R_{301}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;

$C_5$-$C_{12}$cycloalkyl or $C_5$-$C_{12}$cycloalkenyl;

phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammonium or an alkali metal cation;

if k is 2

$R_{301}$ is $C_1$-$C_{18}$alkylene, $C_3$-$C_{18}$alkenylene or $C_3$-$C_{18}$alkinylene, which may be unsubstituted or substituted, by one or more OH, $C_1$-$C_8$alkoxy, carboxy, $C_1$-$C_8$alkoxycarbonyl;

or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms;

if k is 3, $R_{301}$ is a trivalent radical of an aliphatic, cycloaliphatic or aromatic tricarboxylic acid; and if k is 4, $R_{301}$ is a tetravalent radical of an aliphatic, cycloaliphatic or aromatic tetracarboxylic acid.

Preferably $G_{16}$ is hydrogen and $G_{15}$ is hydrogen or $C_1$-$C_4$alkyl, in particular methyl, and $G_{11}$ and $G_{13}$ are methyl and $G_{12}$ and $G_{14}$ are ethyl or propyl or $G_{11}$ and $G_{12}$ are methyl and $G_{13}$ and $G_{14}$ are ethyl or propyl.

The 4 imino compounds of formula V can be prepared for example according to E. G. Rozantsev, A. V. Chudinov, V. D. Sholle.: Izv. Akad. Nauk. SSSR, Ser. Khim. (9), 2114 (1980), starting from the corresponding 4-oxonitroxide in a condensation reaction with hydroxylamine and subsequent reaction of the OH group. The compounds are described WO 02/100831 (Ciba)

Preference is given to compounds wherein the structural element of formula (II') is of formula A', B' or O', $$\left[ \begin{array}{c} G_1 \quad G_2 \quad G_6 \\ O\cdot\!\!-\!\!N \quad \quad O\!\!-\!\!R, \\ G_3 \quad G_4 \quad G_5 \end{array} \right]_m \quad (A')$$

$$\left[ \begin{array}{c} G_1 \quad G_2 \quad G_6 \\ \quad \quad \quad R_{101} \\ O\cdot\!\!-\!\!N \quad \quad N\!\!-\!\!R_{102}, \\ G_3 \quad G_4 \quad G_5 \end{array} \right]_p \quad (B')$$

$$\begin{array}{c} O \\ G_6 \quad \quad G_5 \\ G_1 \quad \quad \quad G_3 \\ G_2 \quad N \quad G_4 \\ O\cdot \end{array} \quad (O')$$

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH$(OH)—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl.

Also suitable are the compounds wherein the structural element $$\begin{array}{c} \diagdown \\ N\!\!-\!\!O\cdot \\ \diagup \end{array}$$

is of formula (III')

$$\left[ \begin{array}{c} G_{12} \quad G_{11} \quad G_{16} \\ O\cdot\!\!-\!\!N \quad \quad\quad\quad =N \\ \quad \quad \quad \quad \quad \quad\quad Y\!\!-\!\!R_{301} \\ G_{14} \quad G_{13} \quad G_{15} \end{array} \right]_k \quad (III')$$

wherein $G_{11}$, $G_{12}$, $G_{13}$ and $G_{14}$ are independently $C_1$-$C_4$alkyl or $G_{11}$ and $G_{12}$ together and $G_{13}$ and $G_{14}$ together, or $G_{11}$ and $G_{12}$ together or $G_{13}$ and $G_{14}$ together are pentamethylene;

$G_{15}$ and $G_{16}$ are each independently of the other hydrogen or $C_1$-$C_4$alkyl;

k is 1, 2, 3, or 4

Y is O, $NR_{302}$ or when n is 1 and $R_{301}$ represents alkyl or aryl Y is additionally a direct bond;

$R_{302}$ is H, $C_1$-$C_{18}$alkyl or phenyl;

if k is 1

$R_{301}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;

$C_5$-$C_{12}$cycloalkyl or $C_5$-$C_{12}$cycloalkenyl;

phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammonium or an alkali metal cation;

if k is 2

$R_{301}$ is $C_1$-$C_{18}$alkylene, $C_3$-$C_{18}$alkenylene or $C_3$-$C_{18}$alkinylene, which may be unsubstituted or substituted, by one or more OH, $C_1$-$C_8$alkoxy, carboxy, $C_1$-$C_8$alkoxycarbonyl;

or xylylene; or

R$_{301}$ is a bisacyl radical of an aliphatic dicarboxylic acid having 2 to 36 carbon atoms, or a cycloaliphatic or aromatic dicarboxylic acid having 8-14 carbon atoms;

if k is 3,

R$_{301}$ is a trivalent radical of an aliphatic, cycloaliphatic or aromatic tricarboxylic acid; and if k is 4, R$_{301}$ is a tetravalent radical of an aliphatic, cycloaliphatic or aromatic tetracarboxylic acid.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preferred is alkenyl with 3 bis 12, particularly preferred with 3 to 6 carbon atoms.

Alkinyl with 3 to 18 is a linear or branched radical as for example propinyl (—CH$_2$—C≡CH), 2-butinyl, 3-butinyl, n-2-octinyl, or n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

C$_2$-C$_{18}$alkyl interrupted by at least one O atom is for example —CH$_2$—CH$_2$—O—CH$_2$—CH$_3$, —CH$_2$—CH$_2$—O—CH$_3$, or —CH$_2$—CH$_2$—O—CH$_2$—CH$_2$—CH$_2$—O—CH$_2$—CH$_3$—. It is preferably derived from polyethylene glycol. A general description is —((CH$_2$)$_a$—O)$_b$—H/CH$_3$, wherein a is a number from 1 to 6 and b is a number from 2 to 10.

C$_2$-C$_{18}$alkyl interrupted by at least one NR$_5$ group may be generally described as —((CH$_2$)$_a$—NR$_5$)$_b$—H/CH$_3$, wherein a, b and R$_5$ are as defined above.

C$_3$-C$_{12}$cycloalkyl is typically, cyclopropyl, cyclopentyl, methylcyclopentyl, dimethylcyclopentyl, cyclohexyl, methylcyclohexyl or trimethylcyclohexyl.

C$_6$-C$_{10}$ aryl is for example phenyl or naphthyl, but also comprised are C$_1$-C$_4$alkyl substituted phenyl, C$_1$-C$_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

C$_7$-C$_9$phenylalkyl is benzyl, phenylethyl or phenylpropyl.

C$_5$-C$_{10}$heteroaryl is for example pyrrol, pyrazol, imidazol, 2, 4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butyl-4-hydroxyphenyl)propionyl radical.

C$_1$-C$_{18}$alkanoyl is for example, formyl, propionyl, butyryl, octanoyl, dodecanoyl but preferably acetyl and C$_3$-C$_5$alkenoyl is in particular acryloyl.

In particular polymerization process a) is very suitable. When process a) is used the nitroxylether according to the structures outlined above splits between the O—X bond. The fragment (E) in formula (I) corresponds then to the O—N fragment and the initiating fragment (In) corresponds to the C centered radical of the group X.

Particularly suitable nitroxylethers and nitroxyl radicals are those of formulae

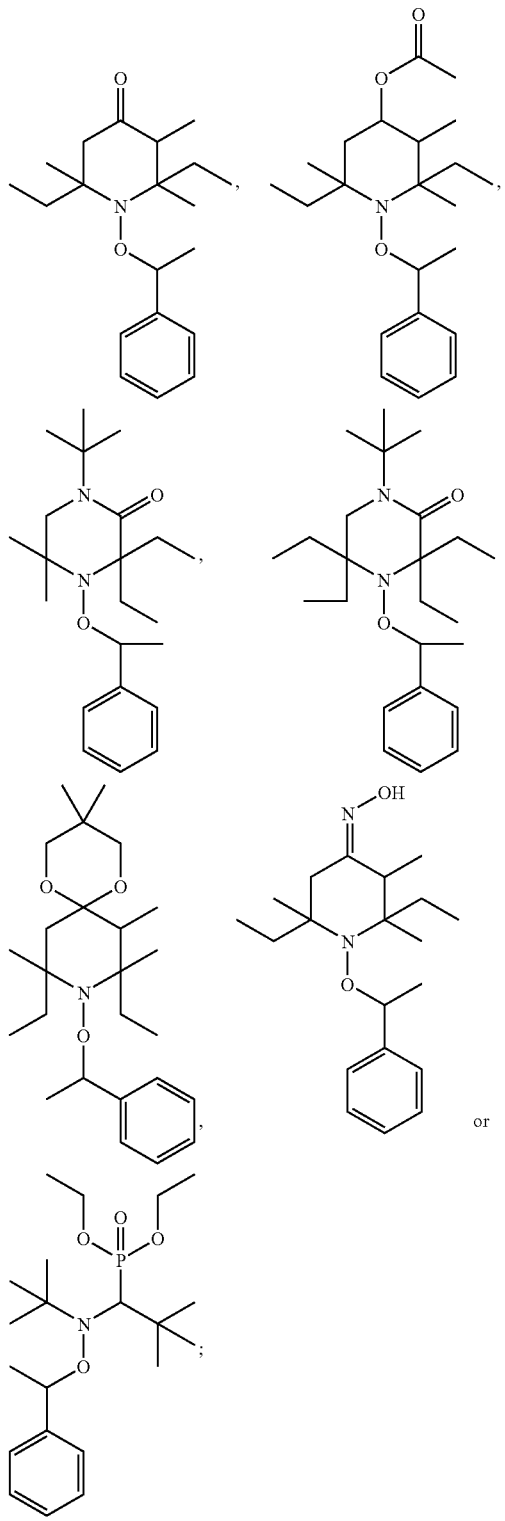

-continued

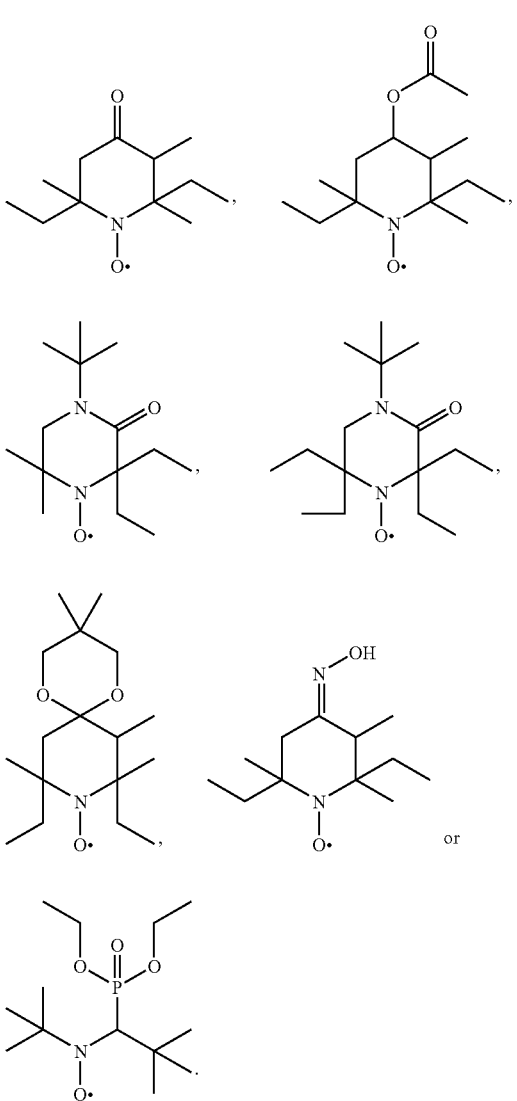

In a very specific embodiment of the invention, the polymers or copolymers are prepared with a compound of formula (O1)

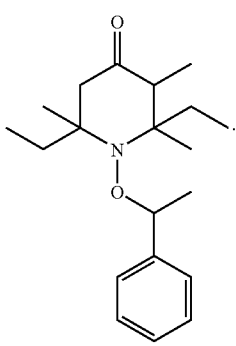

In this case the initiating fragment (In) in formula (I) is

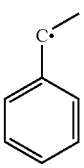

and the group (E) is

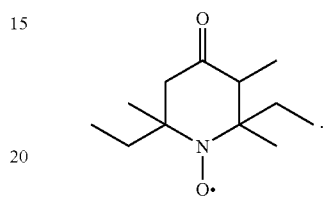

When the process according to route b is chosen, the initiating fragment (In) corresponds to the radical derived from the free radical initiator. The free radical initiator of route b) is preferably an azo compound, a peroxide, perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

The group E must not necessarily be a stable free nitroxyl radical, which is bound via the oxygen atom to the polymer or copolymer. It is also possible that it is a group, which results from a substitution or elimination reaction of the attached stable free nitroxyl radical.

For the introduction of another group at the chain end or to render the nitroxyl-terminated polymer non-reactive, several possibilities exist to remove or exchange the nitroxide (NO*). Some specific examples are given below.

The nitroxide chain end can e.g. be exchanged by the use of compounds that can generate radicals upon homolytic cleavage e.g. tetraphenylethane based products. Exchange of the nitroxide chain end is carried out by heating the polymer in the presence of e.g. a tetraphenyl ethane derivative up to a temperature were the equilibrium between the open and closed chain end is active. Exchange of the nitroxide and the homolytically cleaved tetraphenyl ethane derivative takes place. This is for example described by Beyou, E.; Jarroux, N.; Zydowicz, N.; Chaumont, P. Macromol. Chem. Phys. 2001, 202, 974-79 (Functional End-Group Exchange of Nitroxide- or Bromo-Terminated Polystyrene)

The nitroxide chain end can also be removed by the use of Zn/acetic acid under the formation of an OH-group at the chain end. This is described by Chessa, G.; Scrivanti, A.; Matteoli, U.; Castelvetro, V. Polymer 2001, 42, 9347-53 (Synthesis of three- and six-arms polystyrene via living/controlled free radical polymerisation)

A further possibility is the use of unsaturated compounds, which cannot be readily homo-polymerised via radical polymerisation. Examples are monomers like maleic anhydride, maleimide, n-substituted maleimides, maleic acid esters, fumaric acid esters, α-methylstyrene, dialkylfumarates, or non-activated alkenes like isobutene, cyclohexene, 1-octene or isomers, alkylallylethers, allylesters. Such unsaturated compounds are preferentially added to the NO*-terminated polymer after consumption and/or removal of the monomers, which are reactive in nitroxyl-mediated polymerization. The NO*-terminated polymer and the non-polymerisation reactive unsaturated compound are than heated to elevated temperatures e.g. 100-150° C. for a time period sufficient to render the polymer inactive towards further chain growth. Without being bound to any theory, it is believed, that by such a post-treatment with non-reactive monomers, all or most of the NO*-groups are split off from the polymer and one or only a few units of the non-reactive unsaturated compound are inserted at the polymer chain end. Specific examples for such a post-treatment functionalization is the reaction with maleic anhydride and maleimides under the formation of a double bond as described by Harth, E.; Hawker, C. J.; Fan, W.; Waymouth, R. M. Macromolecules 2001, 34(12), 3856-62 (Chain End Functionalization in Nitroxide-Mediated "Living" Free Radical Polymerizations)

Yet another possibility is the use of compounds that can induce a fragmentation at the chain end e.g. by using methacrylates in nitroxide mediated free radical polymerisation. The nitroxide chain end of an acrylic polymer can be removed by heating with e.g. an excess of methyl methacrylate at a temperature were the equilibrium of the open and closed chain end is active. Formation of a double bond at the chain end and the removal of the nitroxide can be observed, as described by Cheng, C.; Yang, N.-L. Polymer Preprints 2003, 41(1), 1010-11 C. Burguiere, M.-A. Dourges, B. Charleux, J.-P. Vairon, Macromolecules, 1999, 32, 3883-3890.

A simple method for elimination of NO* from the polymer made by nitroxide mediated controlled free radical polymerisation is by heating to high temperatures after removal of the reactive monomer. This leads to a polymer, which is inactive for further nitroxyl-mediated polymerisation. Without being bound to theories, it is believed that by such thermal post-treatment the NO* groups eliminates or is exchanged from the polymer.

Preferably the polymer of the formula I, is composed of at least 30%, more preferred of at least 50% by weight of n-butylmethacrylate, and 0.5 to 50%, more preferred of 1 to 20% of a multifunctional monomer which is selected from the group consisting of propargyl(meth)acrylate, preferably propargylacrylate.

The polymers of the present invention have preferably a polydispersity of from 1.0 to 2.

Use

The polymers can be used as pigment wetting agent and/or dispersant. Furthermore, the polymers can be used as starting material for all reactions starting with an alkyne (e.g. Reppe processes) or as starting material for hydrosilylation reactions.

EXAMPLES

Preparation of Poly-(n-butyl acrylate)-co-(propargyl acrylate)

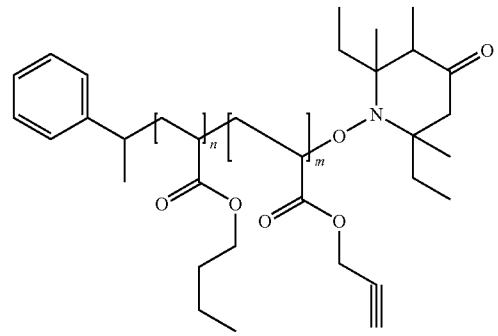

A mixture of the polymerization regulator 1-(1-phenylethoxy)-2,3,6-trimethyl-2,6-diethyl-4-oxopiperidine) [see U.S. Pat. No. 6,353,107] and n-butyl acrylate is placed in a 250 ml three neck flask, equipped with thermometer, cooler and magnetic stirrer, and degassed twice. The clear solution obtained is heated under nitrogen to 125 ° C. and polymerization is carried out to a solid content of ~45%. The remaining monomer is removed by evaporation under vacuum.

Propargyl acrylate is added. The clear mixture is degassed twice and heated under nitrogen to 130° C. and polymerization is carried out to a solid content of ~77%. The remaining propargyl acrylate is removed by distillation under vacuum.

A clear yellowish viscous fluid is obtained. For detailed mol ratios and product data see table!

|  | Example 1 | Example 2 | Example 3 |
|---|---|---|---|
| Polymerization regulator [g] | 5.00 | 3.05 | 1.76 |
| n-Butyl acrylate [g] | 123.20 | 110.60 | 123.20 |
| Propargyl Acrylate [g] | 32.00 | 28.70 | 20.00 |
| Product data [GPC] | | | |
| $M_n$ | 6800 g/mol | 8620 g/mol | 9650 g/mol |
| $M_w$ | 9470 g/mol | 13400 g/mol | 14060 g/mol |
| PD | 1.39 | 1.55 | 1.46 |

The invention claimed is:

1. Polymer of formula (I)

$$\text{In-}[(A)_x\text{-}(B)_y\text{-}(A')_{x'}\text{-}(E)_z]_n \quad (I)$$

obtained by nitroxyl mediated controlled free radical polymerization whereby an excess of acrylate is present, wherein In is the initiator fragment starting the polymerisation reaction;

A and A' are the same or different monomers selected from the group consisting of acrylic acid, methacrylic acid, acrylonitrile, methacrylonitrile, acrylic acid ($C_1$-$C_{22}$) alkyl esters, acrylic acid ($C_1$-$C_{22}$)hydroxyalkyl esters, methacrylic acid ($C_1$-$C_{22}$)alkyl esters, methacrylic acid ($C_1$-$C_{22}$)hydroxyalkyl esters, acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, —$SO_3H$, epoxy, fluoro, perfluoro or siloxane groups, styrene, substituted styrene, acrylamide methacrylamide, N-mono($C_1$-$C_{22}$)alkyl acrylamide and N,N-di($C_1$-$C_{22}$)alkyl acrylamide; provided that the amount of unsubstituted acrylic acid ($C_1$-$C_{22}$)alkyl esters or/and methacrylic acid ($C_1$-$C_{22}$)alkyl esters is more than 30% by weight based on the weight of the total monomer mixture; and B is at least one multifunctional monomer with two or more ethylenically unsaturated bonds with the proviso that at least one of these ethylenically unsaturated bonds is of higher reactive than the other double or triple bond or bonds E is a group bearing at least one stable free nitroxyl radical, which is bound via the oxygen atom to the polymer or copolymer; or a group which results from a substitution or elimination reaction of the attached stable free nitroxyl radical;

x and x' independently is zero or a number between 5 to 5000;

y is a number between 5 to 5000;

z is a number 1 or greater than 1 indicating the average number of end groups E attached to the monomer sequence $(A)_x$-$(B)_y$;

n is a number from 1 to 20.

2. Polymer according to claim 1, wherein the polymer is a homopolymer (x and x' are zero) or a diblock, triblock, multiblock copolymer, a gradient copolymer or a tapered copolymer.

3. Polymer according to claim 1, wherein

A is a monomer selected from the group consisting of styrene, methylacrylate, ethylacrylate, n-butylacrylate, isobutylacrylate, tert. butylacrylate, hydroxyethylacrylate, hydroxypropylacrylate, dimethylaminoethylacrylate, glycidylacrylates, methyl(meth)acrylate, ethyl (meth)acrylate, butyl(meth)acrylate, hydroxyethyl (meth)acrylate, hydroxypropyl(meth)acrylate, dimethylaminoethyl(meth)acrylate, glycidyl(meth) acrylates, acrylonitrile, acrylamide, methacrylamide, dimethylaminopropyl-methacrylamide and mixtures thereof; and B is a monomer selected from the group consisting of propargyl(meth)acrylate, allyl(meth)acrylate, butinyl (meth)acrylate, (meth)acrylate esters of polyunsaturated fatty alcohols and diallyl maleate.

4. Polymer according to claim 3, wherein A is a monomer selected from the group consisting of methylacrylate, ethylacrylate, ethylhexylacrylate, propylacrylate, cyclohexylacrylate, hydroxyethylacrylate, n-butylacrylate, styrene and vinylpyridine and B is propargylacrylate.

5. Polymer according to claim 1, wherein the polymer of formula (I) is obtained by a) polymerization in the presence of alkoxyamine initiator/regulator compounds having the structural element

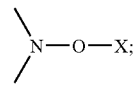

or b) polymerization in the presence of a stable nitroxyl free radical having the structural element

and a radical initiator (source of free radicals).

6. Polymer according to claim 5, wherein the structural element

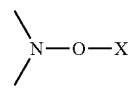

is a structural element of formula (II) and the structural element

is a structural element of formula (II')

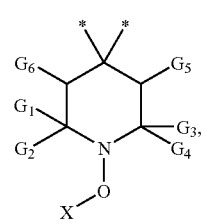

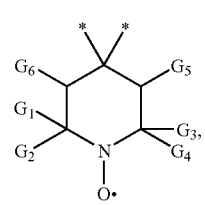

wherein $G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_3$-$C_{12}$cycloalkyl group;

$G_5$, $G_6$ independently are H, $C_1$-$C_{18}$alkyl, phenyl, naphthyl or a group $COOC_1$-$C_{18}$alkyl;

X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

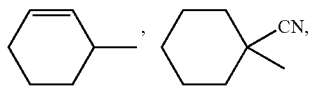

CH$_2$CH=CH$_2$, CH$_3$CH—CH=CH$_2$, (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl and (C$_1$-C$_4$)alkyl-CR$_{20}$—C(O)—NH$_2$, wherein R$_{20}$ is hydrogen or (C$_1$-C$_4$)alkyl and * denotes a valence.

7. Polymer according to claim 1, wherein E is of formula A', B' or O', (A')

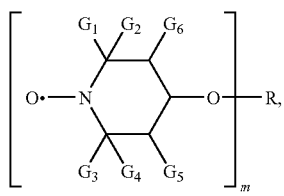

(B')

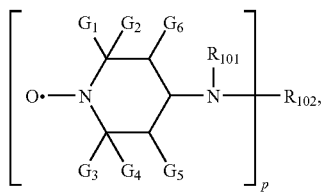

(O')

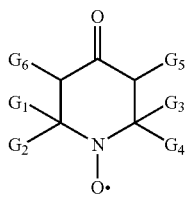

wherein
m is 1,
R is selected from the group consisting of hydrogen, C$_1$-C$_{16}$alkyl which is uninterrupted or interrupted by one or more oxygen atoms, cyanoethyl, benzoyl, glycidyl, a monovalent radical of an aliphatic carboxylic acid having 2 to 18 carbon atoms, a cycloaliphatic carboxylic acid having 7 to 15 carbon atoms, an α,β-unsaturated carboxylic acid having 3 to 5 carbon atoms and an aromatic carboxylic acid having 7 to 15 carbon atoms;
p is 1;
R$_{101}$ is C$_1$-C$_{12}$alkyl, C$_5$-C$_7$cycloalkyl, C$_7$-C$_8$aralkyl, C$_2$-C$_{18}$alkanoyl, C$_3$-C$_5$alkenoyl or benzoyl;
R$_{102}$ is C$_1$-C$_{18}$alkyl, C$_5$-C$_7$cycloalkyl, C$_2$-C$_8$alkenyl unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl;
G$_6$ is hydrogen and G$_5$ is hydrogen or C$_1$-C$_4$alkyl,
G$_1$ and G$_3$ are methyl and G$_2$ and G$_4$ are ethyl or propyl or
G$_1$ and G$_2$ are methyl and G$_3$ and G$_4$ are ethyl or propyl.

8. Polymer according to claim 1 wherein E is

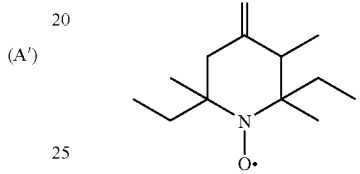

and the initiating fragment (In) in formula (I) is

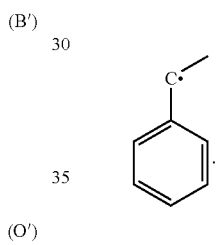

9. A composition comprising a pigment and the polymer according to claim 1 as pigment wetting agent and/or dispersant.

10. A process wherein the polymer according to claim 1 is a starting material for all reactions starting with an alkyne or as starting material for hydrosilylation reactions.

11. A polymer according to claim 1 wherein at least one of z or n is 1.

12. A polymer according to claim 1 wherein each of z and n is 1.

13. A polymer according to claim 1 wherein A or A' is n-butylmethacrylate and B is propargyl(meth)acrylate.

* * * * *